United States Patent Office 3,442,916
Patented May 6, 1969

---

3,442,916
ISOLATION OF EBURICOIC ACID
Friedrich Dursch, Freehold, N.J., assignor to E. R. Squibb & Sons, Inc., New York, N.Y., a corporation of Delaware
No Drawing. Filed June 27, 1967, Ser. No. 649,141
Int. Cl. B01d *11/00;* C12d *13/00;* A61k *27/00*
U.S. Cl. 260—397.1         8 Claims

ABSTRACT OF THE DISCLOSURE

This invention relates to a novel procedure for isolation of eburicoic acid from natural, as well as synthetic, sources. It has been discovered that by treating eburicoic acid containing materials with a base and a lower aliphatic alcohol, eburicoic acid may be recovered in substantially quantitative yield.

---

This invention relates to a new and improved method for separating eburicoic acid from natural material or other matter containing said acid.

Eburicoic acid is a $C_{31}$-steroid carboxylic acid having the structural formula

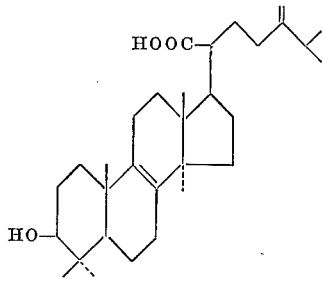

This compound is known to be useful in the preparation of various streoids which possess physiological activity. Eburicoic acid has been found in nature as a metabolic product of various fungi, mostly members of the class Basidiomycetes. Particularly useful are such fungi as *Polyporus sp.*, such as *P. anthracophilus, P. eucalyptroum, P. hispidus* and especially *P. sulfureus; Fomes sp.,* such as *F. officinalis; Poria sp.,* such as *P. cocos,* and *Lentinus sp.,* such as *L. dactyloides,* whether grown in artificial submerged or surface cultures or harvested from their natural growth on certain host trees.

Extraction methods for recovering eburicoic acid from the mentioned natural sources have been previously described, and are well known to the art. However, these known extraction procedures have a few disadvantages in common that make their application on a technical scale impractical. They are not specific and thus yield impure isolates. They are time consuming, requiring a number of days for completion. In addition, considerable amounts of solvents (e.g., ether or chloroform) are required and recourse has to be taken to the tedious process of recycle extraction. The products are subjected to considerable periods of heating in these extraction solvents and there are additional steps of predrying and defatting of the plant material before the actual extraction process can be carried out.

The present invention permits rapid and substantially quantitative extraction of eburicoic acid from plant material under mild conditions at ambient temperature without preliminary drying or defatting.

In accordance with this invention it has been found that eburicoic acid is extracted from material by a process which comprises reacting the material with a base to form a salt and extracting the salt with a lower aliphatic alcohol. The salt, which is soluble in alcohol, is then acidified to precipitate eburicoic acid in substantially pure form. Essentially, it has been discovered that eburicoic acid reacts with various bases to form a salt which has a low solubility in water, e.g., about one percent or less, but has a high solubility, e.g., of about ten percent or more in lower aliphatic alcohols.

Bases which may be utilized in the practice of this invention are alkali metal hydroxides, e.g., sodium hydroxide, lithium hydroxide or potassium hydroxide; ammonia, and amines, e.g., triethylamine, N-methylmorpholine, dibutylamine, methylamine, or N,N-dimethylbenzylamine.

The salts formed by treatment of the eburicoic acid containing material with these bases may then be extracted with lower aliphatic alcohols, such as one having from one to ten carbons and preferably having from four to eight carbons. Examples of alcohols useful in the practice of this invention include methanol, isopropanol, n-butanol, sec. amyl alcohol, octanol, and the like.

Alcohols of only limited water solubility, e.g., n-butanol or sec. amyl alcohol may be utilized in the extraction step to remove possible coextracted water soluble impurities from the extract by the simple expedient of a water wash.

The alcoholic extracts containing the salts of eburicoic acid may be reduced by distillation without precipitation of the desired material. Impurities of limited solubility are thus precipitated and may be removed by filtration or centrifugation.

The concentrate is then acidified to precipitate substantially pure eburicoic acid. Acidification may be done with the common mineral acids, e.g., sulfuric, phosphoric or hydrochloric acid; carbonic acid; or with organic acids, e.g., formic or acetic acid. To provide for solubility of the salts of these acids, it may be desirable before acidification to mix the concentrate with enough water to form a separate phase. Slow acidification leads to relatively large crystals of eburicoic acid and is preferred.

A further advantage of the present invention is based on the weakly basic nature of eburicoic acid. Acidification to a pH from about 9 to about 6 is sufficient to precipitate eburicoic acid substantially quantitatively while stronger acids remain in the soluble salt form and do not contaminate the product. It is understood that when the base is initially added, the pH of the solution is from about pH 10 to about pH 11.

The precipitate is isolated in the usual manner, e.g., by filtration or centrifugation, and is washed with sufficient fresh solvent to displace the mother liquor. The product is dried under vacuum at elevated temperature, e.g., about 80° C.

Eburicoic acid, when isolated by the disclosed process from cultures of fungi or from natural fungus growth, is free of sulfurenic acid and usually sufficiently pure for use as a chemical intermediate. Pharmaceutical grade eburicoic acid may be obtained by recrystallization from dilute lower alcohols. Thin layer chromatography on silica gel plates in a solvent mixture of chloroform and methanol, 9:1 by volume, may be used to establish homogeneity of the product.

The following examples are illustrative of this invention. All temperatures are in degrees centigrade unless otherwise stated:

EXAMPLE 1

A fermentation broth of *Polyporus sulfureus* (70 liters) having a pH of about 2 was stirred with Hyflo filter aid (2.1 kg.). The slurry was filtered on a precoated Buchner filter and the filter cake was washed with water until the effluent was essentially colorless. The filtrate was discarded. The moist filter cake was granulated and was slurried with n-butanol (12 liters). Sufficient 20 percent aqueous sodium hydroxide solution was added to reach an apparent pH of about 11 as measured by a glass electrode. Another equal portion of this caustic solution was added and the mixture was stirred for one hour at room temperature. The slurry was subsequently filtered on a pad filter and the cake was washed carefully with n-butanol until the effluent was colorless. The cake wis discarded. The combined filtrate and wash were concentrated by vacuum distillation at room temperature to a concentration of about 10 percent w./v. of total solids. The turbid concentrate (about 1.1 liters) was stirred with Hyflo filter aid (11 grams) and was polish filtered. The clear filtrate was stirred with an equal volume of water and sufficient 20 percent sulfuric acid (12 ml.) was added to adjust the mixture to pH 9. The product was allowed to crystallize for one hour. The pH was then lowered gradually to about 6 with more 20 percent sulfuric acid (18 ml.). The product was isolated by filtration and was washed with water-saturated n-butanol until the filtrate was colorless. Vacuum drying to constant weight at 80° C. afforded crude eburicoic acid (33 grams), having a melting point of about 275° C. Thin layer chromatography showed only a minor contamination. Pure eburicoic acid of melting point 280–285° C. was obtained in about 80 percent recovery by recrystallization of the crude acid from 80 percent aqueous n-propanol.

EXAMPLE 2

Eburicoic acid was obtained in about 3 percent weight yield when coarsely ground fungus bodies of tree-grown *Fomes officinalis* were substituted for the moist filter cake of Example 1 and were further treated as described in Example 1.

EXAMPLE 3

Eburicoic acid is also recovered from the fermentation broth of *Polyporus sulfureus* if triethylamine is utilized in lieu of sodium hydroxide in the procedure of Example 1.

EXAMPLE 4

Following the procedure of Example 1 but utilizing hexanol in lieu of butanol, eburicoic acid will be recovered.

EXAMPLE 5

Following the procedure of Example 1 but utilizing dibutylamine in lieu of sodium hydroxide, eburicoic acid will be recovered.

EXAMPLE 6

Following the procedure of Example 1 but utilizing dibutylamine in lieu of sodium hydroxide, eburicoic acid will be recovered.

EXAMPLE 7

Following the procedure of Example 1 but utlizing potassium hydroxide in lieu of sodium hydroxide, eburicoic acid will be recovered.

EXAMPLE 8

Following the procedure of Example 1 but utilizing *Poria cocos* in lieu of *Polyporus sulfureus*, eburicoic acid will be recovered.

The invention may be variously otherwise embodied within the scope of the appended claims.

What is claimed is:

1. A process for extracting eburicoic acid from material which comprises reacting the material containing eburicoic acid with a base to form a salt and extracting the salt with an aliphatic alcohol.

2. A process in accordance with claim 1 wherein the base is selected from the group consisting of alkali metal hydroxide; ammonia and amines.

3. A process in accordance with claim 2 wherein the aliphatic alcohol contains from one to ten carbons.

4. A process in accordance with claim 3 wherein the alkali metal hydroxide is sodium hydroxide.

5. A process in accordance with claim 4 wherein the aliphatic alcohol is butanol.

6. A process in accordance with claim 1 wherein the salt extracted with an aliphatic alcohol is precipitated by acidifying the alcohol to a pH of from about 9 to about 6.

7. A process in accordance with claim 6 wherein a mineral acid is utilized to acidify the alcohol.

8. A process in accordance with claim 7 wherein the mineral acid is sulfuric acid.

No references cited.

ELBERT L. ROBERTS, *Primary Examiner.*